United States

Smith, Jr.

[11] 3,824,008

[45] July 16, 1974

[54] METHOD AND APPARATUS FOR CAPTURE AND RETENTION OF A TRANSIENT IMAGE

[75] Inventor: Homer A. Smith, Jr., Ontario, N.Y.

[73] Assignee: Eastman Kodak Company, Rochester, N.Y.

[22] Filed: July 28, 1972

[21] Appl. No.: 276,195

[52] U.S. Cl.............................. 353/26, 350/160 LC
[51] Int. Cl. ............................................ G03b 21/10
[58] Field of Search ........ 350/160 LC, 117; 353/26, 353/19

[56] References Cited
UNITED STATES PATENTS

| | | | |
|---|---|---|---|
| 3,592,527 | 7/1971 | Conners........................ | 350/160 LC |
| 3,674,338 | 7/1972 | Cantwell...................... | 350/160 LC |
| 3,708,677 | 1/1973 | Volk ..................................... | 353/26 |

FOREIGN PATENTS OR APPLICATIONS

| | | | |
|---|---|---|---|
| 1,155,045 | 6/1969 | Great Britain....................... | 353/19 |

*Primary Examiner*—Louis R. Prince
*Assistant Examiner*—A. Jason Mirabito
*Attorney, Agent, or Firm*—Lawrence P. Kessler

[57] ABSTRACT

Apparatus for retention of an image of a transient source on a photoconductor-liquid crystal display panel whereby the image may be captured and stored for observation over a longer period of time than would be available with the transient source alone. An illumination device for illuminating the transient source and presenting the image thereof to the photoconductor-liquid crystal display panel is connected to an actuation system set to trigger the illumination device when the transient source desired to be viewed is in proper position (or assumed to be in the proper position) with relation to the display panel to be imaged thereon.

11 Claims, 1 Drawing Figure

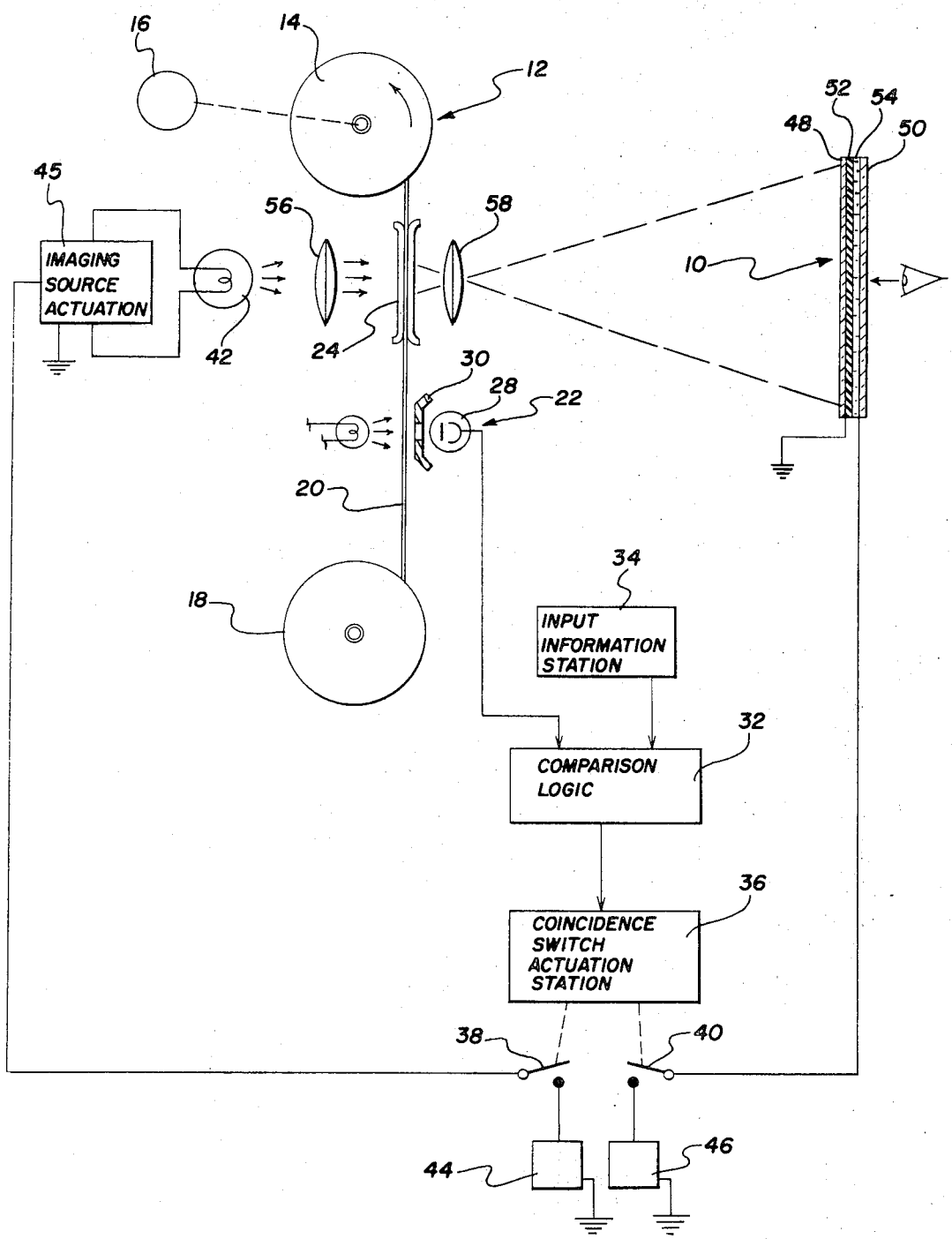

METHOD AND APPARATUS FOR CAPTURE AND RETENTION OF A TRANSIENT IMAGE

CROSS REFERENCE TO RELATED APPLICATIONS

Reference is hereby made to commonly assigned, co-pending U.S. Pat. application No. 151,342, entitled MICROFILM CAMERA, filed in the name of John E. Morse on June 9, 1971, now abondoned and U.S. Pat. application No. 166,917, entitled POSITIVE-NEGATIVE MICROFILM FILM READER, filed in the name of Wayne Spani on July 28, 1971 now U.S. Pat. No. 3,768,897 issued Oct. 30, 1973.

BACKGROUND OF THE INVENTION

1. Field of the Invention

This invention relates to the capture and retention of an image of a transient source for observation over a period of time longer than would be available with the transient source alone and more particularly to a photoconductor-liquid crystal display panel to capture and retain the image of the transient source.

2. Description of the Prior Art

In many instances where it is desired to view a moving object for a specific purpose, circumstances make it impractical to obtain a sufficient view of the object to accomplish the desired purpose. Some circumstances which create insufficient viewing conditions include inspection of a stream or a field of items that are moving too fast for appropriate observation, are too remote from the desired monitoring point or have a field of view too large for effective monitoring or some other attribute that makes memory of a sensed event too difficult for casual observation. Examples of problem areas in which obtaining sufficient viewing time of a moving object may prove difficult include medical observation of rapidly moving cells for analytical viewing, monitoring or auditing of packaging in a fast moving production line, and detecting hot boxes in moving railroad equipment. In present known practice, these diverse exemplary areas use cameras and film processing or CRT's with image refresh electronics to accomplish the necessary proper examination. These methods of course are complex and in the case of the camera and film processing are somewhat delayed from the actual event being examined.

Another area in which practical viewing of a moving object has presented problems has been in the area of reading of microfilm. In microfilm information storage and retrieval systems reduced information images are recorded on film with a substantial reduction in size of the images. The size reduction provides a correspondingly substantial reduction in information storage volume and simplifies mass handling of information. Since thousands of information images may be stored on a single reel of film, hand searching of these images for information retrieval would be extremely time consuming. Accordingly, automatic searching techniques have been developed which use coding arrangements wherein an information image is accompanied by an appropriate code field, or serves as the code per se when an image counting technique is used. An automatic microfilm reader may be arranged to count a preselected number of information images to reach a desired image or scan and decode the code fields to locate particular code fields of desired information images to be retrieved. After locating a predetermined information image the reader moves the identified image to a projection station where the image is continuously projected onto a viewing screen.

One system used for automatic microfilm information searching may be found in the commonly assigned U.S. Pat. No. 3,290,987 of James et al. In this particular system a reel of microfilm is rapidly scanned until a timing mark associated with the information document code field is recognized and that code field is scanned and compared with a desired code stored in memory. If the two codes correspond, a hit signal is produced and means are activated to stop the film. However, because of the speed at which the search of the film is undertaken, the desired portion of the film to be viewed will be advanced a considerable length past the reader station after the hit signal is produced and before the film is stopped. The direction of the film must then be reversed and the film moved backward until the identified image is stopped in a projection station where it may be projected upon a viewer screen in an enlarged format or reproduced by a copier. As will be appreciated, a considerable portion of the searching time is related to the slow speed retracing of the film in order to bring the desired image into the viewing area.

SUMMARY OF THE INVENTION

There is accordingly provided herein a means for capturing and retaining an image produced by a transient source for observation over a longer period of time than would be available with the transient source alone. An actuation system is set up so as to determine the time at which the transient source will be (or is predicted to be) adjacent a photoconductor-liquid crystal display panel. As the transient source passes a position in relation to the photoconductor-liquid crystal display panel, an imaging illumination device will be actuated to illuminate the transient source and project the image thereof onto the display panel in its activated state. The image will be captured and retained in the panel for observation and inspection for a period of time substantially longer than that time during which the transient source is available for viewing.

BRIEF DESCRIPTION OF THE DRAWING

The FIGURE represents a schematic view of an exemplary system for capturing the image of a transient source on a photoconductor-liquid crystal display panel according to this invention.

DESCRIPTION OF THE PREFERRED EMBODIMENT

Referring now to the drawing, an arrangement is shown which embodies the generic concept of this invention; i.e., determining the existence of a transient source and illuminating the transient source at such time as to obtain an image thereof on an activated photoconductor-liquid crystal display panel in order to accomplish the capturing and retention thereof. The drawing shows in schematic an apparatus for obtaining an image on a photoconductor-liquid crystal display panel 10 from selected frames of a moving strip of microfilm in a microfilm system 12. It is of course understood that this arrangement is exemplary and imaging of any of the aforementioned transient sources could be similarly accomplished. The microfilm system 12 comprises a take-up reel 14 being driven by an appropriate drive motor 16 and a supply reel 18. The strip of microfilm 20 from the supply reel 18 passes through an actuation system which includes a detection device 22, and then through a film gate 24 before being taken up on the take-up reel 14. The film 20 contains a series of information images and a code system related to respective images. This code system may be of any particular type, varying in complexity from one for merely counting a preselected number of images to a code field interspaced between the images shown for example in the commonly assigned U.S. application Ser. No. 166,917 of W. Spani.

The detection system 22, which must of course be compatible with the coding of film 20, may be of any conventional type and is shown herein for purposes of illustration as comprising an illumination source 26 which is observed by a photoresponsive means, such as a photocell 28, through a limiting aperture 30. The modulated light received from the illumination source 26 by the photocell 28 is directly related to the code on the film 20 as it passes by the limiting aperture 30. A signal representative of the light modulation is generated by the photocell 28 and passed to a comparison logic station 32 where it is compared with a particular desired information code from an input information station 34. As noted the selected code may be a particular number of counts representative of the passage of a set number of information images, or may be a complex set of variables which must be present in the desired information image. If the signal received at the photocell 28, when compared with the input information from the station 34, is identical thereto, an output signal will be generated which indicates that a desired information image has been detected on the microfilm 20. This signal will be passed to a coincidence switch actuation station 36 which actuates switches 38 and 40 in a timed relationship so as to coordinate the function of an illumination source 42 and the photoconductor-liquid crystal display panel 10 with respective power sources 44 and 46 as to be explained hereinbelow.

The photoconductor-liquid crystal display panel 10 is constructed so as to have opposing transparent electrodes 48 and 50 between which are sandwiched layers of photoconductive material 52 and liquid crystal material 54. When a voltage is applied across the electrodes 48 and 50, an illuminating radiation pattern striking the photoconductive material 52 causes a decrease in resistivity in that area of the material 52 receiving the radiation, permitting a current flow between the electrodes in the areas corresponding to the pattern of illuminating radiation received by the photoconductive material 52. Current flow causes localized dynamic scattering (light diffusion) within the liquid crystal material 54 such that the current flow pattern based on the received illuminating radiation pattern becomes an image in the liquid crystal of clear and diffuse areas. The illumination radiation pattern is formed by illuminating the information bearing filmstrip 20 with the illumination source 42 to generate a pattern based on the particular information image illuminated (or any particular transient source). The liquid crystal material 54 used may be so constituted that the information image received by the display panel 10 will be stored therein even after the voltage has been disconnected. For example, the liquid crystal material may be 5 molar percent cholesteryl 2-ethylhexanoate in N-(p-methoxybenylidene) -p-butylanline; such a photoconductor-liquid crystal display panel with storage characteristics is more fully described in commonly assigned U.S. Pat. application Ser. No. 151,342 of J. E. Morse filed June 9, 1971.

Imaging of the desired information image on the photoconductor-liquid crystal display panel 10 is accomplished by the timed relation of the actuation of switches 38 and 40 as follows. Upon closure the switch 40 will apply a voltage from power source 46 to the panel 10 so that the panel is ready to be imaged when exposed to the illumination pattern. The switch 38, upon closure, will apply a voltage from power source 44 to the illumination source 42 through an illumination source actuation means 45. When the illumination source 42 is actuated, radiation therefrom will be passed through a collimator lens 56 to the film gate 24 where it illuminates the desired information image (transient source) from the microfilm strip 20. The resultant image is transmitted to the display panel 10 by the objective lens 58 so as to impose a radiation pattern on the photoconductive material 52 of the panel 10 corresponding to the desired document image.

The timed relation of actuation of the panel 10 and radiation source 42 is critical in order to capture a desired transient source, in that simultaneous operation must occur only at the time the transient source is in a position to be illuminated by the illumination source 42 and imaged on the display panel 10. Preferably this is accomplished by activating the panel 10 for a relatively longer period and pulsing the illumination source 42 as the desired information image passes therebetween. It is of course understood that the timing of the activation of the panel 10 and radiation source 42 (within the framework of the above limitation on simultaneous operation) is dependent upon the selected operating characteristics of the elements comprising the panel 10 and illumination source 42 as well as the nature of the transient source whose image is to be captured. In other words, depending on the components of the overall system and the source whose image is to be retained, the panel 10 may be maintained activated and the source 42 pulsed, the source 42 may be maintained activated and the panel 10 pulsed, the panel 10 and the source 42 may be pulsed in a set timed relationship (as descirbed), or the panel 10 and source 42 may be continuously activated with a timed shutter (not shown) placed therebetween. After the desired image has been retained for a sufficient time to permit observation, the stored image may be erased by application across the electrodes 48 and 50 of a high frequency AC potential source (not shown) as described in aforementioned U.S. Ser. No. 151,342.

While the invention has been described as applied to a microfilm system in which a specific desired information image is to be captured without the necessity of stopping the microfilm and positioning it relative to the photoconductor-liquid crystal display panel, it is of course understood that it could be used in conjunction with other transient sources such as a series of articles to be packaged, a series of railroad cars, or even a group of moving blood cells. The related transient source detection system need only be sufficient to initiate illumination of the desired transient source to be viewed at the proper time to obtain image capture and storage of the transient source within the photoconductor-liquid crystal display panel. The invention can also be used to establish the existance of a predicted occurance of a transient source by manual or timed pulsing to view a transient stream to see if in fact the presumed transient source is present. The particular detection system used may be of any known type such as systems utilizing reflected light, magnetic signals or fluidic sensors or, as noted, may be based on manual actuation or set time actuation based on assumed occurance of the transient source. Through appropriate logic, time delays, amplification, and signal processing, the sensed, manual or timed signals can readily be converted into signals capable of initiating illumination exposure of the desired transient source at the instant that the source is properly located (or assumed to be properly located) with respect to the display panel. By using liquid crystal material with image storage capabilities, the image of the transient source can be stored for observation and examination over a longer period of time than would be available with the transient source alone.

The invention has been described in detail with particular reference to a preferred embodiment thereof, but it will be understood that variations and modifications can be effected within the spirit and scope of the invention as described hereinabove.

I claim:

1. A method for automatically searching for and capturing, on a selectively activated image storing photoconductor-liquid crystal display panel, a desired information image from a moving film bearing a plurality of information images, said method comprising the steps of:
   determining the presence of said particular desired information image in the moving film;
   producing an initiating signal when the presence in the moving film of the desired information image is determined; and
   using said initiating signal in a time relationship to coordinate activation of the photoconductor-liquid crystal display panel into its image storage mode and activation of a source of illumination so as to illuminate the desired information image and project said information image onto said activated display panel for storage therein.

2. A method for automatically searching for and capturing, on a selectively activated image storing photoconductor-liquid crystal display panel, a desired information image from a moving film bearing a plurality of information images and distinctive coding specifically representative of each of the information images, said method comprising the steps of:
   determining the distinctive coding of said particular desired information image;
   detecting the codings of said moving film;
   comparing the codings of said moving film as detected with the determined distinctive coding of the particular information image;
   producing an initiating signal when the detected coding and the distinctive coding are in agreement indicating the presence in the moving film of the desired information image; and
   using said initiating signal in a time relationship to coordinate activation of a photoconductor-liquid crystal display panel into a storage mode and activation of a source of illumination so as to illuminate the desired information image and project said information image onto said activated display panel for storage therein.

3. The method of claim 2 wherein the step of detecting the codings includes illuminating the moving film and viewing the illuminated portion of the film with a photoresponsive device to generate a signal dependent upon the light modulation characteristics of the film as received by said photoresponsive device.

4. Apparatus for automatically searching for and capturing, on a photoconductor-liquid crystal display panel, an information image from a moving film bearing information images and distinctive codings specifically representative of each of the document images, said apparatus comprising:
   drive means for continuously moving said information image bearing film;
   detection means for detecting the distinctive codings on said film and generating a signal representative thereof;
   means for selecting a particular coding representative of a specific desired information image and generating a signal representative thereof;
   comparison means for comparing said signals from said detection means and said particular coding selection means, said comparison means generating a third signal when the first two signals are in agreement;
   a selectively activatable photoconductor-liquid crystal display panel located adjacent said information image bearing film;
   a source of illumination located with respect to said information image bearing film and said photoconductor-liquid crystal display panel so as to be capable of selective illumination of said information image bearing film and projection of that image onto said photoconductor-liquid crystal display panel; and
   actuation means responsive to said third signal for activating said photoconductor-liquid crystal display panel and said source of illumination in timed relationship as said desired document image moves through its position where it will be illuminated by said illumination source.

5. The apparatus of claim 4 wherein said detection means includes a second source of illumination positioned so as to illuminate said distinctive codings on said document image bearing film and a photoresponsive device positioned to receive light from said second source of illumination after it has been modulated by said distinctive codings and generate a signal responsive to the light characteristics received thereby.

6. Apparatus for capturing, on an image storing photoconductor-liquid crystal display panel, an image from a desired transient source within a transient stream for subsequent observation comprising:
   means for predicting the existence of said desired transient source in said transient stream and generating a signal in response thereto;
   a selectively activated photoconductor-liquid crystal display panel located adjacent the transient stream;
   a source of illumination located with respect to the transient stream and photoconductor-liquid crystal display panel so as to selectively illuminate said desired transient source and project the image thereof onto said photoconductor-liquid crystal display panel; and
   actuation means responsive to said signal from said predicting means for activating said illumination source and said photoconductor-liquid crystal display panel in timed relationship as said desired transient source moves through its predicted position where it will be illuminated by said illumination source, said actuation means including a first means for pulsed activation of said illumination source and for substantially continuous activation of said photoconductor-liquid crystal display panel.

7. The apparatus of claim 6 wherein said predicting means includes a coding means associated with each item in said transient stream, first means for detecting said coding means, second means for selecting a coding representative of said desired transient source, and comparison means for comparing the detected coding of said first means with the selected coding of said second means to determine a condition of agreement therebetween, and a signal generator for generating a signal if said codings are in agreement.

8. Apparatus for capturing, on an image storing photoconductor-liquid crystal display panel, an image from a desired transient source within a transient stream for subsequent observation comprising:

means for predicting the existence of said desired transient source in said transient stream and generating a signal in response thereto;

a selectively activated photoconductor-liquid crystal display panel located adjacent the transient stream;

a source of illumination located with respect to the transient stream and photoconductor-liquid crystal display panel so as to selectively illuminate said desired transient source and project the image thereof onto said photoconductor-liquid crystal display panel; and actuation means responsive to said signal from said predicting means for activating said illumination source and said photoconductor-liquid crystal display panel in timed relationship as said desired transient source moves through its predicted position where it will be illuminated by said illumination source, said actuation means including a first means for substantially continuous activation of said illumination source and second means for pulsed activation of said photoconductor-liquid crystal display panel.

9. The apparatus of claim 8 wherein said predicting means includes a coding means associated with each item in said transient stream, first means for detecting said coding means, second means for selecting a coding representative of said desired transient source, and comparison means for comparing the detected coding of said first means with the selected coding of said second means to determine a condition of agreement therebetween, and a signal generator for generating a signal if said codings are in agreement.

10. Apparatus for capturing, on an image storing photoconductor-liquid crystal display panel, an image from a desired transient source within a transient stream for subsequent observation comprising:

means for predicting the existence of said desired transient source in said transient stream and generating a signal in response thereto;

a selectively activated photoconductor-liquid crystal display panel located adjacent the transient stream;

a source of illumination located with respect to the transient stream and photoconductor-liquid crystal display panel so as to selectively illuminate said desired transient source and project the image thereof along an optical path to said photoconductor-liquid crystal display panel; and actuation means responsive to said signal from said predicting means for activating said illumination source and said photoconductor-liquid crystal display panel in timed relationship as said desired transient source moves through its predicted position where it will be illuminated by said illumination source, said actuation means including a first means for substantially continuous activation of said illumination source and a second means for substantially continuous activation of said photoconductor-liquid crystal display panel and a third means in said optical path between said illumination source and said photoconductor-liquid crystal display panel for selectively permitting illumination radiation from said illumination source to strike said photoconductor-liquid crystal display panel.

11. The apparatus of claim 10, wherein said predicting means includes a coding means associated with each item in said transient stream, first means for detecting said coding means, second means for selecting a coding representative of said desired transient source, and comparison means for comparing the detected coding of said first means with the selected coding of said second means to determine a condition of agreement therebetween, and a signal generator for generating a signal if said codings are in agreement.

* * * * *